United States Patent
Dakshinyam et al.

(10) Patent No.: US 11,070,449 B2
(45) Date of Patent: Jul. 20, 2021

(54) INTELLIGENT APPLICATION DEPLOYMENT TO DISTRIBUTED LEDGER TECHNOLOGY NODES

(71) Applicant: BANK OF AMERICA CORPORATION, Charlotte, NC (US)

(72) Inventors: Srinivasa Rao Dakshinyam, Telangana (IN); Shashank Raju Birudharaju, Telangana (IN); Govinda Rajulu Nelluri, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 394 days.

(21) Appl. No.: 16/209,146

(22) Filed: Dec. 4, 2018

(65) Prior Publication Data

US 2020/0177478 A1 Jun. 4, 2020

(51) Int. Cl.
*H04L 12/24* (2006.01)
*G06F 8/61* (2018.01)
*G06F 16/182* (2019.01)

(52) U.S. Cl.
CPC ........... *H04L 41/5096* (2013.01); *G06F 8/61* (2013.01); *G06F 16/1824* (2019.01); *H04L 41/0806* (2013.01); *H04L 41/5054* (2013.01)

(58) Field of Classification Search
CPC ............ H04L 41/5096; H04L 41/5054; H04L 41/0806; G06F 8/61; G06F 16/1824
See application file for complete search history.

(56) References Cited

U.S. PATENT DOCUMENTS

| 11,025,417 | * | 6/2021 | Li ........................ H04L 9/3213 |
| 2005/0246415 | A1 | 11/2005 | Belfiore et al. |
| 2006/0239206 | A1 | 10/2006 | Rao et al. |
| 2006/0294381 | A1 | 12/2006 | Mitchell et al. |
| 2007/0061878 | A1 | 3/2007 | Hagiu et al. |
| 2012/0311339 | A1 | 12/2012 | Irvine |
| 2013/0061049 | A1 | 3/2013 | Irvine |
| 2014/0075518 | A1 | 3/2014 | D'Souza et al. |
| 2015/0244690 | A1 | 8/2015 | Mossbarger |
| 2015/0310188 | A1 | 10/2015 | Ford et al. |
| 2016/0321654 | A1* | 11/2016 | Lesavich .............. H04L 67/10 |
| 2016/0330027 | A1 | 11/2016 | Ebrahimi |
| 2017/0041296 | A1 | 2/2017 | Ford et al. |
| 2017/0195336 | A1 | 7/2017 | Ouellette |
| 2017/0279774 | A1* | 9/2017 | Booz .................... G06Q 20/123 |

(Continued)

FOREIGN PATENT DOCUMENTS

WO WO-2017213943 A1 * 12/2017 ............... H04L 9/32

*Primary Examiner* — Javier O Guzman
(74) *Attorney, Agent, or Firm* — Michael A. Springs; Moore & Van Allen PLLC; Nicholas C. Russell

(57) ABSTRACT

A system for intelligently deploying applications to nodes on a distributed ledger technology (DLT) network may receive requests from authorized users to deploy DLT-based applications to one or more nodes in a DLT network. The system may further identify the DLT network for deploying the application by analyzing a set of characteristics associated with the application with a set of characteristics associated with a DLT network. The system may also generate deployment scripts for the applications that include instructions compatible with the identified DLT network and to be performed by the one or more nodes to implement the application code.

15 Claims, 3 Drawing Sheets

(56) References Cited

U.S. PATENT DOCUMENTS

| | | | |
|---|---|---|---|
| 2018/0101842 A1* | 4/2018 | Ventura | G06F 3/0619 |
| 2018/0109541 A1* | 4/2018 | Gleichauf | H04W 12/10 |
| 2018/0329693 A1* | 11/2018 | Eksten | G06F 16/21 |
| 2019/0012249 A1 | 1/2019 | Mercuri et al. | |
| 2019/0013932 A1 | 1/2019 | Maino et al. | |
| 2019/0013933 A1 | 1/2019 | Mercuri et al. | |
| 2019/0013934 A1 | 1/2019 | Mercuri et al. | |
| 2019/0013948 A1 | 1/2019 | Mercuri et al. | |
| 2019/0018863 A1* | 1/2019 | Wu | H04L 47/62 |
| 2019/0068615 A1* | 2/2019 | Pack | H04L 9/3236 |
| 2019/0102409 A1* | 4/2019 | Shi | H04L 67/2823 |
| 2019/0163672 A1* | 5/2019 | Shmueli | G07F 17/329 |
| 2019/0392164 A1* | 12/2019 | Dutta | G06F 21/602 |
| 2019/0394113 A1* | 12/2019 | Huang | H04L 9/0643 |
| 2020/0167319 A1* | 5/2020 | Fritz | H04L 41/0806 |
| 2020/0177478 A1* | 6/2020 | Dakshinyam | H04L 41/5096 |

\* cited by examiner

INTELLIGENT APPLICATION DEPLOYMENT TO DISTRIBUTED LEDGER TECHNOLOGY NODES

FIELD OF THE INVENTION

The present disclosure embraces a system, computer program product, and computer-implemented method for intelligently deploying applications to nodes on a distributed ledger technology (DLT) network.

BACKGROUND

Within an enterprise, authorized users of the enterprise's systems frequently develop applications for use on a DLT node or network. However, it is difficult to develop DLT-based applications that can be implemented on any DLT platform (e.g. Ethereum, Hyperledger, Corda, and the like). Instead, users must develop different versions of the desired application to be implemented across the various DLT platforms upon which they will run. Therefore, a need exists for a system that can intelligently deploy, install and register DLT applications to any DLT network, regardless of the implementation or platform utilized by the target DLT network.

BRIEF SUMMARY

The following presents a simplified summary of one or more embodiments of the invention in order to provide a basic understanding of such embodiments. This summary is not an extensive overview of all embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, computer program products, and methods for intelligently deploying application to distributed ledger technology (DLT) nodes. Embodiments of the present invention comprise one or more processor components, one or more memory components operatively coupled to the one or more processor components, and computer-readable instructions stored on the one or more memory components configured to cause the one or more processor components to receive a request from an authorized user to deploy application code to one or more DLT network nodes, identify a DLT network on which to deploy the received application code, generate a deployment script, wherein the deployment script comprises executable instructions compatible with the identified DLT network and to be performed by the one or more nodes to implement the application code, and install the application code, wherein installing the application comprises executing the deployment script at the one or more nodes.

In additional or alternative embodiments of the invention, the deployment script further comprises a self-contained invoking mechanism.

In additional or alternative embodiments of the invention, installing the application further comprises the one or more nodes initiating the invoking mechanism.

In additional or alternative embodiments of the invention, identifying the DLT network comprises comparing a set of characteristics associated with the application code to a set of characteristics associated with previously identified DLT networks, wherein the set of characteristics associated with previously identified DLT networks is stored in a database communicatively coupled to the system, and based on the comparison, determine a DLT network with compatible characteristics for the application code.

In additional or alternative embodiments of the invention, the compatible characteristics comprise one of a programming language, minimum signer details, proof of work/stake method, or deployment technology.

In additional or alternative embodiments of the invention, the system is further configured to store a set of characteristics associated with the application code and a set of characteristics associated with the one or more nodes on which the application code was installed in a database communicatively coupled to the system.

DETAILED DESCRIPTION OF EMBODIMENTS OF THE INVENTION

Figure 1:
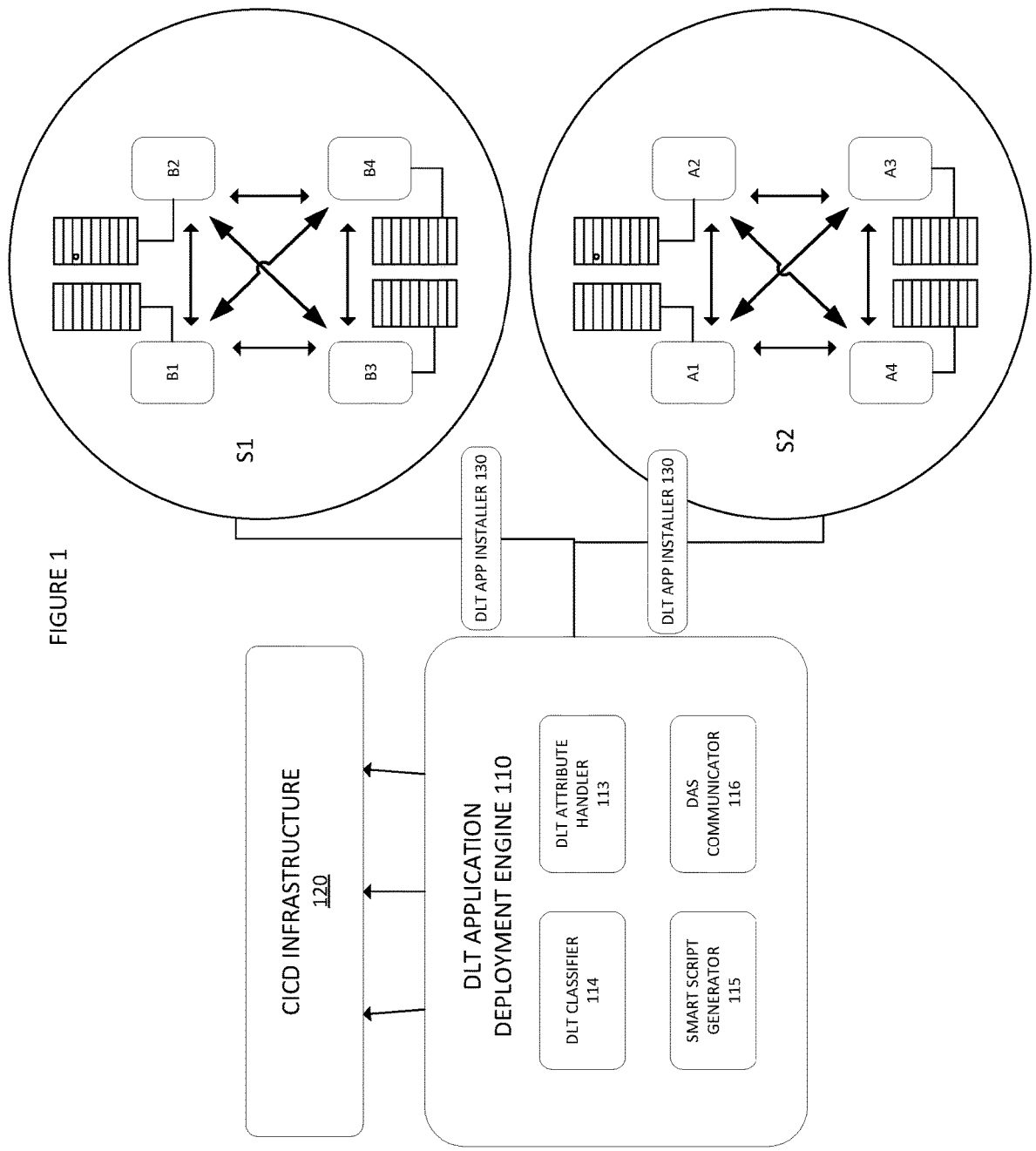
FIG. 1 is a system diagram depicting an exemplary embodiment of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the extended recognition system described herein is implemented. The entity may be a business organization, a non-profit organization, a government organization, and the like.

"Entity system" as used herein may refer to the computing systems and/or other resources used by the entity to execute DLT and non-DLT functions.

"User" as used herein may refer to an individual who may interact with the entity system. Accordingly, the user may be an employee, associate, contractor, or other authorized party who may access, use, administrate, maintain, and/or manage the computing systems within the entity system.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Distributed ledger" or "distributed electronic ledger" as used herein may refer to a structured list of data records that is decentralized and distributed amongst a plurality of computing systems and devices. In some embodiments, the distributed ledger may be a blockchain ledger. "Node" as used herein may refer to a computing system on which the distributed ledger is hosted. Typically, each node maintains a full copy of the distributed ledger.

"Distributed ledger technology network" or "DLT network" as used herein may refer to a network of servers, computer systems or other computing devices configured to perform at least some DLT-functions.

"Consensus," "consensus algorithm," or "consensus mechanism" as used herein may refer to the process or processes by which nodes come to an agreement with respect to the contents of the distributed ledger. Typically, changes to the ledger (e.g., addition of data records) may require consensus to be reached by the nodes in order to become a part of the authentic version of the ledger. The nodes may use various different mechanisms or algorithms to obtain consensus, such as proof-of-work ("PoW"), proof-of-stake ("PoS"), practical byzantine fault tolerance ("PBFT"), or the like.

"Resource" as used herein may refer an object which is typically transferred between the third party and the entity. The object may be tangible or intangible objects such as computing resources, data files, documents, funds, and the like.

Embodiments of the present disclosure provide a system, computer program product, and method for intelligently deploying, registering and installing applications on a DLT network. In particular, the systems described herein are capable of installing an application on a DLT network or node regardless of the specific DLT network implementation or the requirements for installing or registering an application based on that implementation. For example, open source DLT networks such as Ethereum may use decentralized applications (Dapps) to run applications; however, other DLT network implementations such as Hyperledger use chaincode instantiated through a software developer's kit (SDK) or command line interface (CLI) onto the Hyperledger network. The present invention leverages various artificial intelligence, machine learning and similar technologies to intelligently deploy applications to a DLT network or node regardless of the implementation. Thus, a user may develop the application for any DLT network, and the present system will be able to deploy, register and install the application regardless of the implementation used on the target DLT network.

In general, the DLT networks as described herein are comprised of a number of nodes connected of a network. The nodes may be a server or other computing device that is capable of performing DLT functions, including communication with other nodes on the DLT network, executing consensus algorithms to determine contents of a distributed ledger (e.g., validating data records and/or approving or rejecting additional data records), forming smart contracts, or the like. In a DLT network, some nodes may be permissioned, while other nodes are not—in other words, only a subset of all of the nodes in a DLT network may be able to participate in the performing the consensus algorithm or other DLT-functions affecting the distributed ledger. In DLT networks as described herein, the nodes may exist on a variety of commercially available private/public cloud infrastructures, including Docker, Kubernets, Openshift, and the like. The various infrastructures may be established to serve different uses, depending on the needs of the authorized user. Further, a user may require different ledger types to establish the distributed ledger on the DLT network. For example, different use case may be well suited for Corda, while other use cases may require Hyperledger Fabric, Ethereum, or some other commercially available distributed ledger. Lastly, the DLT networks provisioned according to embodiments of the present invention may use specific programming languages to perform the DLT-functions (e.g., node.js) and require access to specific relational or memory databases.

FIG. 1 is a system diagram of the intelligent application deployment system according to embodiments as described herein. As shown in FIG. 1, the system comprises at least a DLT application deployment engine 110, a CICD infrastructure 120, and one or more DLT networks S1 and S2 comprised of one or more nodes. As further shown in FIG. 1, the DLT application deployment engine 110 is further comprised of several sub-components, namely a DLT classifier 114, a DLT attribute handler 113, a smart script generator 115, and a DLT application station (DAS) communicator 116. Collectively, these components handle the majority of the tasks necessary to receive take an application for deployment to one or more DLT networks and intelligently station the application on the DLT networks S1 and S2 based on the infrastructure and implementation of the particular DLT network. A more detailed description of the sub-components of the DLT application deployment engine 110 is set forth below.

The DLT attribute handler 113 is a software component of the DLT network application deployment engine 110 that is used to maintain the information related to the respective DLT networks S1 and S2. For example, the DLT attribute handler 113 may store information such as the tech stack (i.e., the combination of programming languages, tools and frameworks) for the applicable DLT network and the dependency information for the same. The DLT attribute handler 113 is configured to maintain both front-end and back-end information for the respective DLT networks. In addition, the DLT attribute handler 113 will need to store information regarding each DLT network S1 and S2 relating to the deployment of applications to the DLT network, such as the minimum signer details, proof of work/stake method, deployment technology and the like. Further, the DLT attribute handler 113 includes functionality to identify the foregoing types of information (e.g., tech stack, dependency, minimum signer details, and the like) for a given DLT network, whether or not such information was already stored in the DLT attribute handler 114. Indeed, the DLT attribute handler may leverage machine learning (e.g., neural networks and the like) algorithms to identify DLT network information for a given DLT network based upon the stored information on DLT networks already on the DLT attribute handler 114.

The DLT classifier 114 is responsible for analyzing code for deployment from the CICD Infrastructure 120 identifying which DLT network the code is to be deployed on. In this regard, the DLT classifier 114 may leverage machine learning and other artificial intelligence algorithms to analyze the code to be deployed by the DLT application deployment engine 110 and the CICD infrastructure 120 to determine which DLT network such code should be deployed to and installed or registered on. As the DLT application deployment engine 110 deploys more applications to a broader range of DLT networks, the DLT classifier 114 will become quicker and more accurate at identifying the correct DLT network for the particular code deployment.

The smart script generator 115 is an additional software component of the DLT application deployment engine 110 that works in connection with the foregoing components. The primary responsibility of the smart script generator 115 is to prepare specific instructions based on the application code received from the CICD infrastructure 120 and the DLT network identified by the DLT classifier 114 for deploying, installing and/or registering the particular application at the desired DLT network or node. The smart script generator 115 will also communicate with the DLT attribute handler 113 to understand the specific requirements for implementing the particular application on a given DLT network or node.

The DLT application station (DAS) communicator 116 is a communications module that is responsible for communicating with configurable DLT application installers on the target DLT networks or nodes in order to install the distributed application code. The DAS communicator will use communication protocols based on the identified DLT network and other information obtained from the DLT attribute handler 113 and the DLT classifier 114.

As also shown in FIG. 1, the intelligent DLT application deployment system comprises a continuous integration and continuous delivery (CICD) infrastructure 120, which may include various control repositories, automation servers, and other like tools used in the automated deployment and installation of software applications on enterprise systems. For example, the CICD infrastructure 120 may include tools such as Bitbucket, Jenkins, and Ansible Tower and allow the intelligent DLT deployment 110 to access and use the same.

FIG. 1 also depicts two DLT networks S1 and S2. S1 is a DLT network comprised of DLT nodes B1, B2, B3, and B4, while S2 is a DLT network comprised of nodes A1, A2, A3, and A4. The specific implementations of DLT networks S1 and S2 are discussed in more detail with respect to the remaining figures included herein. However, one having skill in the art will understand that the intelligent application deployment system described herein may interface with any number of DLT networks, each having any implementation and any number of nodes.

As shown in FIG. 1, the system also comprises a DLT application installer 130 positioned between the DLT application deployment engine 110 and the respective DLT networks S1 and S2. The DLT application installer 130 is a plugin that identifies the job command requested from the DAS communicator 116 and is responsible for installing and/or registered the distributed code at the individual nodes (e.g., B1, B2, etc.) The DLT application installer 130 plugin will be specific to each type of DLT network that the system uses for installing application code according to embodiments described herein. As described in more detail below, the components of the system will need to be able to generate deployment scripts based on the DLT network where the code will be implement, wherein the deployment scripts will be compatible with the respective DLT application installers 130. In addition, the generated deployment scripts may comprise self-contained invoking scripts such that when the script is communicated to the DLT network via the DLT application installer 130, the script will invoke the mechanisms required for the DLT application installer 130 to implement the register and/or install the application at the specific DLT network nodes.

In some embodiments, the system may further comprise a deployment interface. The configuration interface may be hosted on the local computing device of an authorized user and permit the authorized user to request deployment of an application to one or more DLT networks S1 and S2.

Figure 2:
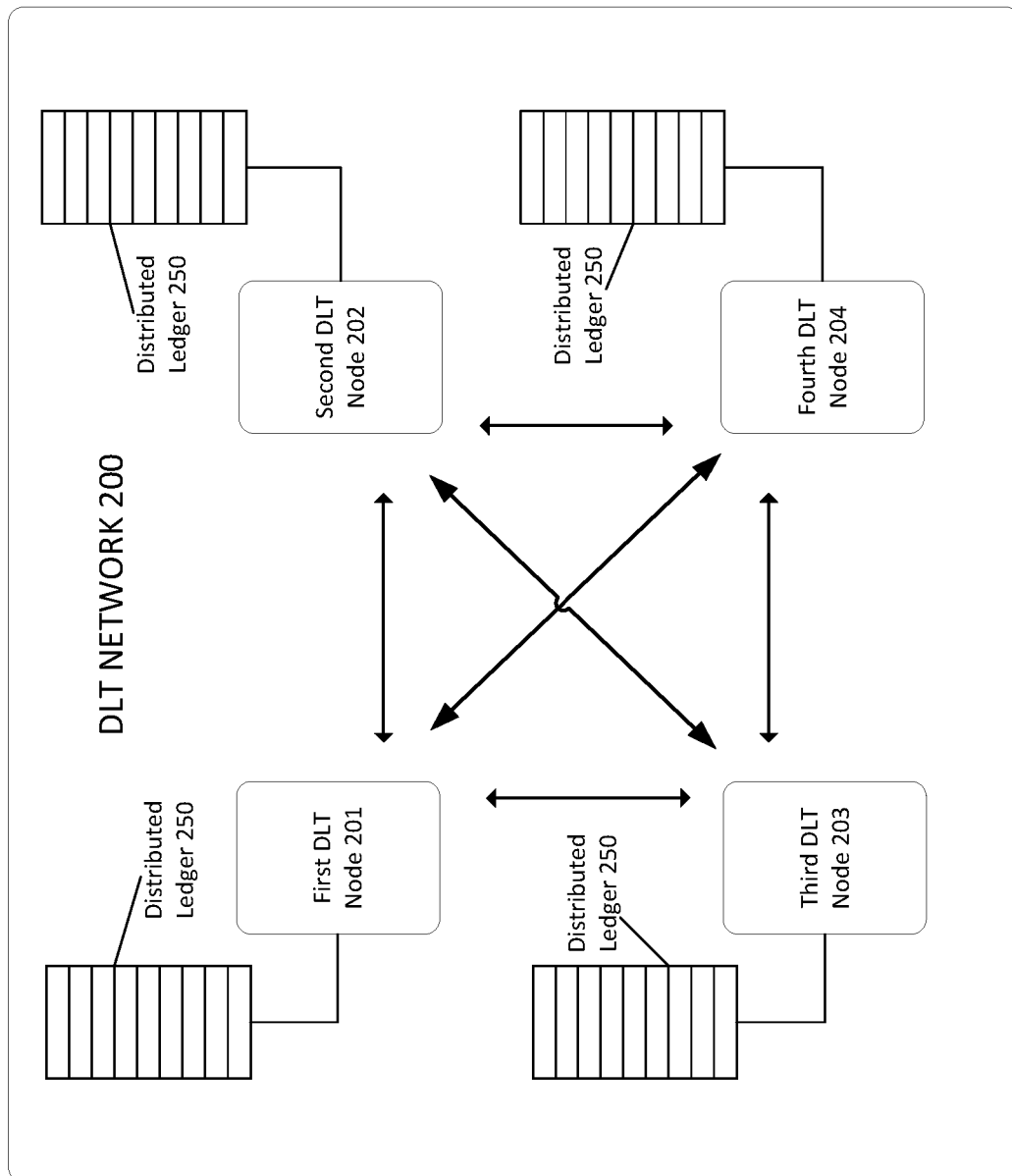
FIG. 2 is a system diagram of a DLT network where applications may be installed according to embodiments of the present invention.

FIG. 2 depicts a more detailed system diagram of a fully provisioned DLT network 200 according to embodiments of the invention as described herein. As shown in FIG. 2, the DLT network 200 is comprised of one or more nodes (specifically, the DLT network 200 in FIG. 2 has 4 nodes, but it is understood that the DLT networks provisioned according to embodiments described herein may have any number of nodes). Each node in the DLT network 200 is in operative communication with the other nodes in the DLT network 200, in order to facilitate necessary DLT functionality. The DLT network 200 may be a global area network (GAN) such as the Internet, a wide area network (WAN), a local area network (LAN) or any other type of network or combination of networks in accordance with the requirements provided by the authorized user. The network may provide for wireline, wireless or a combination of wireline and wireless communication between devices on the network.

As shown, the DLT network 200 of FIG. 2 is comprised of a first DLT node 201, a second DLT node 202, a third DLT node 203, and a fourth DLT node 204. Each node also has a copy of a distributed ledger 250, which should be the same on each node. In order to conduct transactions on the DLT network 200, each node needs to append its copy of the distributed ledger 250 with the same information as the other nodes on the DLT network 200. Embodiments of the present invention as described herein can configured the DLT network 200 (and the corresponding nodes comprising the DLT network 200) to perform these functions in any manner, including by consensus algorithm, smart contract logic, or the like.

It should be understood by those having ordinary skill in the art that although the first DLT node 201, second DLT node 202, third DLT node 203, and fourth DLT node 204 are depicted as single units, each of the depicted components, or sub-components therein, may represent multiple units. In some embodiments, a given computing system as depicted in FIG. 2 may represent multiple systems configured to operate in a distributed fashion. For instance, the first DLT node 201 may represent a plurality of computing system operating in a distributed fashion. In other embodiments, the functions of multiple computing systems may be accomplished by a single system. For instance, the functions of the second DLT node 202 may, in some embodiments, be executed on a single computing system according to the authorized user's need to efficiently distribute computing workloads.

Figure 3:
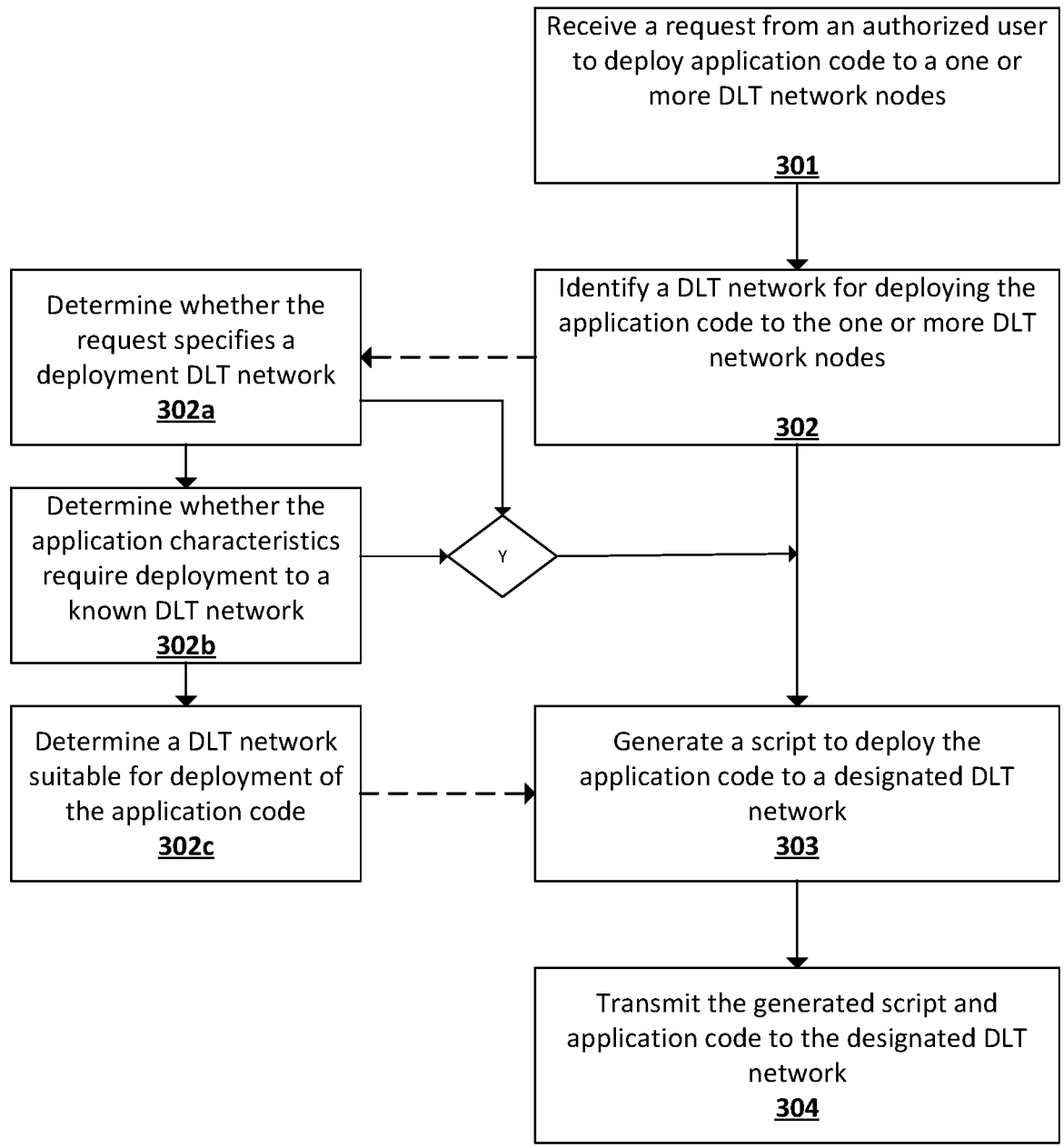
FIG. 3 is a process flow depicting an operational flow chart in accordance with embodiments of the invention

FIG. 3 is a process fib depicting a typical process by which embodiments of the present invention may operate. In that regard, the process flow depicted in FIG. 3 is conducted by elements of the system as described in more detail with respect to FIGS. 1 and 2 above in order to intelligently deploy applications to a DLT network node(s).

As shown in FIG. 3, a typical process begins at block 301, where the system receives a request from an authorized user to deploy application code to one or more DLT network nodes. In some embodiments, an entity may limit the number of authorized users who may use the entity's resources to deploy DLT network applications and prohibit non-authorized users from deploying such applications on the system as described herein.

In addition, an authorized user may access a request portal or other means of requesting deployment of application through a configuration interface or other graphical user interface. The configuration interface may allow the authorized user to submit requests to the intelligent application deployment system from a graphical user interface hosted on the authorized user's computing device that is in operative communication with the intelligent application deployment system. In other embodiments, users may simply submit requests to deploy application code through a command line type interface or the like.

In typical embodiments, the authorized user will develop application code for use on one or more DLT networks or one or more nodes within a DLT network in a development environment hosted on their own computing device. As described in more detail herein, embodiments of the present invention allow the user to develop the application code in a multitude of programming languages, infrastructures and other formats, and the system is responsible for deploying the application code to any DLT node or network regardless of implementation. Accordingly, authorized users may develop a single application code, and the system can deploy such code on any available or compatible DLT node or network. Thus, an authorized user may develop a single application code that can be deployed to DLT networks with different architecture or implementation in accordance with embodiments of the system as described herein.

Once the user has submitted a request to deploy application code to one or more DLT network nodes as shown at block 301, the system proceeds to block 302, where it analyzes the application code to identify a DLT network for deploying the application code to the one or more network nodes. As noted above, the DLT classifier 114 and the DLT attribute handler 113 comprise the software backbone for performing the identification process depicted at block 302.

In some embodiments, the authorized user's request to deploy application to one or more DLT network nodes may specify a particular node within a DLT network on which to deploy the application code. In such an embodiment, the DLT classifier will simply confirm with the DLT attribute handler 113 that the application code is suitable for deployment to the designated DLT network node (in other words, the system must confirm that the application code can be performed by the designated node). In many embodiments, however, the authorized user may develop a DLT-based application without specifying any particular DLT network or node to deploy the application to. In such embodiments, the system (through the DLT classifier 114 and the DLT attribute handler 113) will identify a DLT network for deployment. In still further embodiments, the authorized user may author or develop application code for a specific DLT network or node; however, the code may not be written in a format that is compatible with the designated DLT network or node.

As shown in FIG. 3, to identify a specific DLT network or node(s) for deployment, the DLT classifier, at block 302a first analyzes the request from the authorized user to determine whether a specific node or network was specified. If yes, the system will progress to block 303. Otherwise, the system, at block 302b, determines whether the application characteristics require deployment to a known DLT node or network. In such embodiments, the DLT classifier will analyze the application code characteristics. Application code characteristics may include the programming language used for coding and/or deployment, the minimum signer details, proof of work/stake methods, deployment technology used (e.g., Ethereum, JS/DLT specific, and the like) and other characteristics of the deployment application. In some instances, the specific combination of an application's characteristics may limit the DLT networks on which the application may deployed. In such cases, the DLT classifier 114 communicates with the DLT attribute handler 113 to compare the characteristics of the deployment application with characteristics of DLT networks known to the DLT attribute handler 113. As noted above, the DLT attribute handler 113 maintains a database of DLT networks and nodes and keeps information for each DLT network, which includes deployment applications and the characteristics of such applications as they were deployed to the DLT network. If, at block 302b, the system can determine that the particular characteristics of the deployment application are suitable for only one known DLT network or node(s), the system can then proceed to the block 303 for script generation.

In other embodiments, the DLT classifier 114 will need to determine a DLT network suitable for deployment of the application code, as depicted at block 302c. In such embodiments, the DLT classifier 114 may leverage machine learning algorithms to determine, based on the characteristics of the application and other information such as the CICD/DevOps environment of application, a DLT network or node for deployment of the application code. Here, as the system deploys more applications to more DLT networks or nodes, it can be "trained" according to machine learning algorithms to predict and/or deploy the application code to the correct DLT network or node. The continued analysis of more application code (and the respective characteristics of such code) with the successful deployment of such code to DLT nodes and networks will allow the system to learn which code is compatible with certain DLT nodes or networks.

After performing the comparison and machine learning algorithms as described above, the DLT classifier 114 will identify the most suitable DLT network or node for the application deployment. At this point, the system can proceed to script generation through the smart scripts generator 115.

At block 303, the system, through the smart scripts generator 115, generates a script to deploy the application code to the designated DLT network determined at blocks 302 (and if necessary, blocks 302a through 302c). The smarts scripts generator 115 must analyze both the application code submitted by the authorized user and the DLT network/node identified by the DLT classifier 114 in order to prepare station specific instructions. More specifically, the smart scripts generator 115 must prepare the station specific instructions based on the dependencies of the distributed application installer plugin for each application DLT network or node. As alluded to above, the smarts script generator may also have access to the DLT attribute handler 113 to determine the necessary station specific instructions for deploying and registering/installing the application code at the desired node. Indeed, the DLT attribute handler 113 may further comprise a repository of station specific instructions used to deploy similar application code to the applicable DLT networks and/or nodes.

The smart script generator 115 may further have to alter the application code included in the authorized user's request, in order to ensure that the application code is suitable with the identified DLT network or node. In this sense, the smart script generator may leverage machine learning algorithms to optimize particular application codes for deployment on the applicable DLT network or node. In this sense, the smart script generator 115 can be trained over time to the particular requirements of the DLT networks used for deployment according to the embodiments described herein. In addition, the smart script generator will enable the invoking mechanism in the deployment code and the station specific instructions, if necessary. In some embodiments, the invoking mechanism may be self-contained in the code, such that when it is transmitted to the applicable DLT network or node, it will invoke itself in order to execute the application code on the applicable node.

Once the smart script generator has generated the applicable deployment code and station specific instructions as described in more detail above, the deployment code and station specific instructions are ready to be deployed. At block 304, the system can transmit the generated script and application code to the designated DLT network.

In order to transmit the generated script and application code, the DAS communicator 116 may take the code from the smart script generator and transmit, via the DLT app installers 130, the deployment script and station specific instructions. In some embodiments, the DAS communicator may further communicated with the DLT application installers 130 to evaluate the progress of the code registration/installation at the specific DLT network or node wherein the application is being installed and/or registered.

After the code has been installed or registered and the applicable DLT network or node, the DLT application deployment engine 110 has successfully completed the request from the authorized user to deploy the application code as received at block 301. Thus, the system can then await further requests to deploy applications to one or more additional DLT networks of nodes, according to the embodiments of the invention described above.

As will be appreciated by one of ordinary skill in the art, the present invention may be embodied as an apparatus (including, for example, a system, a machine, a device, a computer program product, and/or the like), as a method (including, for example, a computer-implemented process), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with DLT application deployment systems and.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broader invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An intelligent application deployment system for deploying applications to distributed network technology (DLT) nodes, the system comprising:
   one or more memory components;
   one or more processor components;
   computer-readable instructions stored on the one or more memory components and configured to cause the one or more processor components to:
   receive a request from an authorized user to deploy an application code to one or more designated DLT network nodes;
   determine that the one or more designated DLT network nodes are not compatible with the application code;
   compare a set of characteristics associated with the application code to a set of characteristics associated with previously identified DLT networks, wherein the set of characteristics associated with previously identified DLT networks is stored in a database communicatively coupled to the system;
   based on the comparison, determine a second DLT network with compatible characteristics for the application code on which to deploy the received application code, wherein the second DLT network comprises a set of one or more nodes associated with the second DLT network;
   generate a deployment script, wherein the deployment script comprises executable instructions compatible with the second DLT network and to be performed by the one or more nodes associated with the second DLT network to implement the application code; and
   install the application code, wherein installing the application comprises executing the deployment script at the one or more nodes associated with the second DLT network.

2. The system of claim 1, wherein the deployment script further comprises a self-contained invoking mechanism.

3. The system of claim 2, wherein installing the application further comprises the one or more nodes initiating the invoking mechanism.

4. The system of claim 1, wherein compatible characteristics comprises one of a programming language, minimum signer details, proof of work/stake method, or deployment technology.

5. The system of claim 1, wherein the computer-readable instructions stored on the one or more memory components are further configured to cause the one or more processor components to store a set of characteristics associated with the application code and a set of characteristics associated with the one or more nodes on which the application code was installed in a database communicatively coupled to the system.

6. A computer program product for deploying applications to distributed network technology (DLT) nodes, the computer program product comprising at least one non-transitory computer readable medium comprising computer readable instruction, the instructions comprising instructions for:
   receiving a request from an authorized user to deploy an application code to one or more designated DLT network nodes;
   determining that the one or more designated DLT network nodes are not compatible with the application code;
   comparing a set of characteristics associated with the application code to a set of characteristics associated with previously identified DLT networks, wherein the set of characteristics associated with previously identified DLT networks is stored in a database communicatively coupled to the system;
   based on the comparison, determining a second DLT network with compatible characteristics for the application code on which to deploy the received application code, wherein the second DLT network comprises a set of one or more nodes associated with the second DLT network;
   generating a deployment script, wherein the deployment script comprises executable instructions compatible with the second DLT network and to be performed by the one or more nodes associated with the second DLT network to implement the application code; and
   installing the application code, wherein installing the application comprises executing the deployment script at the one or more nodes associated with the second DLT network.

7. The computer program product of claim 6, wherein the deployment script further comprises a self-contained invoking mechanism.

8. The computer program product of claim 7, wherein installing the application further comprises the one or more nodes initiating the invoking mechanism.

9. The computer program product of claim 6, wherein compatible characteristics comprises one of a programming language, minimum signer details, proof of work/stake method, or deployment technology.

10. The computer program product of claim 6 further comprising instructions for storing a set of characteristics associated with the application code and a set of characteristics associated with the one or more nodes on which the application code was installed in a database in operative communication with the computer program product.

11. A method for deploying applications to distributed network technology (DLT) nodes, the method comprising:
    receiving a request from an authorized user to deploy an application code to one or more designated DLT network nodes;
    determining that the one or more designated DLT network nodes are not compatible with the application code
    comparing a set of characteristics associated with the application code to a set of characteristics associated with previously identified DLT networks, wherein the set of characteristics associated with previously identified DLT networks is stored in a database communicatively coupled to the system; and
    based on the comparison, determining a second DLT network with compatible characteristics for the application code on which to deploy the received application code, wherein the second DLT network comprises a set of one or more nodes associated with the second DLT network;
    generating a deployment script, wherein the deployment script comprises executable instructions compatible with the second DLT network and to be performed by the one or more nodes associated with the second DLT network to implement the application code; and installing the application code, wherein installing the application comprises executing the deployment script at the one or more nodes associated with the second DLT network.

12. The method of claim 11, wherein the deployment script further comprises a self-contained invoking mechanism.

13. The method of claim 12, wherein installing the application further comprises the one or more nodes initiating the invoking mechanism.

14. The method of claim 11, wherein compatible characteristics comprises one of a programming language, minimum signer details, proof of work/stake method, or deployment technology.

15. The method of claim 11 further comprising storing a set of characteristics associated with the application code and a set of characteristics associated with the one or more nodes on which the application code was installed in a database.

* * * * *